United States Patent
El-Shoubary et al.

(10) Patent No.: US 9,267,039 B2
(45) Date of Patent: Feb. 23, 2016

(54) NON-MICRONIZED PIGMENT FOR PLASTICS APPLICATION

(71) Applicant: Cristal Inorganic Chemicals Switzerland Ltd, Baar (CH)

(72) Inventors: Modasser El-Shoubary, Crofton, MD (US); Lee Chris Mundle, White Hall, MD (US)

(73) Assignee: Cristal Inorganic Chemicals Switzerland Ltd, Baar (CH)

( * ) Notice: Subject to any disclaimer, the term of this patent is extended or adjusted under 35 U.S.C. 154(b) by 257 days.

(21) Appl. No.: 13/829,357

(22) Filed: Mar. 14, 2013

(65) Prior Publication Data

US 2014/0275332 A1 Sep. 18, 2014

(51) Int. Cl.
 *C09C 1/36* (2006.01)
 *C08J 3/22* (2006.01)
 *C08K 9/04* (2006.01)

(52) U.S. Cl.
 CPC ............... *C09C 1/3669* (2013.01); *C08J 3/226* (2013.01); *C08K 9/04* (2013.01); *C09C 1/36* (2013.01); *C01P 2006/10* (2013.01); *C08J 2323/06* (2013.01); *C08J 2423/06* (2013.01)

(58) Field of Classification Search
 CPC ..... C08L 23/00; C08L 23/025; C08K 3/0033; C08K 3/32; C08K 3/24
 USPC .................. 524/413, 430, 447; 523/202, 200
 See application file for complete search history.

(56) References Cited

U.S. PATENT DOCUMENTS

| | | | |
|---|---|---|---|
| 3,660,129 A | 5/1972 | Luginsland | |
| 3,843,380 A | 10/1974 | Beyn | |
| 4,810,305 A | 3/1989 | Braun et al. | |
| 5,074,475 A | 12/1991 | Suitch et al. | |
| 5,108,508 A | 4/1992 | Rademachers et al. | |
| 5,129,953 A | 7/1992 | Suitch et al. | |
| 5,501,732 A * | 3/1996 | Niedenzu et al. | 106/447 |
| 5,733,365 A | 3/1998 | Halko et al. | |
| 5,837,049 A | 11/1998 | Watson et al. | |
| 5,882,395 A | 3/1999 | Linde et al. | |
| 5,891,237 A | 4/1999 | Kinniard | |
| 5,908,498 A | 6/1999 | Kauffman et al. | |
| 6,544,382 B2 | 4/2003 | Belias et al. | |
| 6,646,037 B1 | 11/2003 | El-Shoubary et al. | |
| 6,765,041 B1 | 7/2004 | El-Shoubary et al. | |
| 7,138,010 B1 * | 11/2006 | El-Shoubary et al. | 106/448 |
| 7,601,780 B2 | 10/2009 | Bell et al. | |

FOREIGN PATENT DOCUMENTS

| | | |
|---|---|---|
| GB | 809284 | 2/1959 |
| WO | WO9730127 | 8/1997 |
| WO | WO/02/42381 A2 | 5/2002 |

OTHER PUBLICATIONS

WO/2014/140845 (PCT/IB2014/000977), International Search Report and Written Opinion, dated Oct. 6, 2014.

* cited by examiner

*Primary Examiner* — Hannah Pak

(57) ABSTRACT

A cost-effective process for loading particulate pigment into a polymer concentrate includes adding a basic pH aqueous solution having a water soluble organic salt to a milled particulate pigment to form an organic-coated particulate pigment. The pH of the basic aqueous solution is sufficiently basic that the water soluble organic salt remains in a salt form. Without a prior micronization step, the organic-coated particulate pigment is mixed with a polymer resin to form a polymer concentrate having from about 50% to about 87% by weight particulate pigment with dispersibility comparable to micronized organic-coated particulate pigment.

19 Claims, No Drawings

NON-MICRONIZED PIGMENT FOR PLASTICS APPLICATION

BACKGROUND OF THE INVENTIVE CONCEPTS

1. Field of the Inventive Concepts

The inventive concepts disclosed and claimed herein relate to methods for making pigment for plastics applications, more particularly, but not by way of limitation, to methods of surface treating pigment for plastics applications such that micronization is not necessary.

2. Brief Description of Related Art

Particulate inorganic pigments are used as opacifiers and colorants in many industries, including the coatings, plastics, and paper industries. Titanium dioxide is the most widely used white pigment in commerce today due to its ability to confer high opacity when formulated into end-use products. Titanium dioxide pigments, are generally micronized to form a finely divided powder and thereby maximize the opacifying properties imparted to materials formulated therewith.

The effectiveness of the particulate pigment in such plastics applications depends, in part, on how evenly the pigment can be dispersed in the polymer melt. Titanium dioxide particles typically have a hydrophilic surface, making them difficult to incorporate in hydrophobic materials such as plastics. Without proper surface treatment, even mixing for long periods of time with high energy levels does not achieve good dispersion. In addition, titanium dioxide powders are inherently dusty and frequently exhibit poor powder flow characteristics during the handling of the powder itself, especially during formulation, compounding, and manufacture of end-use products.

To this end, physical and chemical modification of titanium dioxide particle surfaces has been used to improve the properties of titanium dioxide particles in polymer matrices. Such improvements sought include improved flow characteristics, decreased chemical activity, and improved thermal stability, especially lacing resistance in extruded polymer film applications. Surface treatment agents are added to the particulate titanium dioxide to provide a hydrophobic surface for use in plastics. The titanium dioxide pigment particles are micronized to achieve sufficient de-agglomeration of the pigment particles prior to compounding the pigment with a polymer to produce a polymer concentrate. High performance titanium dioxide master batches have been formulated with increased concentrations of titanium dioxide in the polymer concentrated, making downstream polymer product processing easier and delivering excellent product uniformity and lacing resistance.

To date, high performance master batch research has focused on surface treatment with hydrophobic compounds and has always included micronization. Despite the significant research done in this area, there remains a need for improvements in the economical surface treatment of particulate titanium dioxide that provides improved handling, dispersion and final product properties without the need for micronization.

SUMMARY OF THE INVENTIVE CONCEPTS

The inventive concepts disclosed and claimed herein generally relate to a process for making polymer concentrate. A process for loading particulate pigment into a polymer concentrate comprises the following steps. A basic pH aqueous solution having a water soluble organic salt is added to a milled particulate titanium dioxide-containing pigment to form an organic-coated particulate pigment. The pH of the basic aqueous solution is sufficiently basic that the water soluble organic salt remains in a salt form. Without a prior micronization step, the organic-coated particulate pigment is mixed with a polymer resin to form a polymer concentrate having from about 50% to about 87% by weight particulate pigment with a dispersibility comparable to a micronized organic-coated particulate pigment.

DETAILED DESCRIPTION OF THE EXEMPLARY EMBODIMENTS

Before explaining at least one embodiment of the inventive concepts disclosed herein in detail, it is to be understood that the inventive concepts are not limited in their application to the details of construction, experiments, exemplary data, and/or the arrangement of the components set forth in the following description, or illustrated in the drawings. The presently disclosed and claimed inventive concepts are capable of other embodiments or of being practiced or carried out in various ways. Also, it is to be understood that the phraseology and terminology employed herein is for purpose of description only and should not be regarded as limiting in any way.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, well-known features have not been described in detail to avoid unnecessarily complicating the instant disclosure.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or at least one and the singular also includes the plural unless it is obvious that it is meant otherwise.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

In the present disclosure and appending claims, the term "micronization" and other grammatical forms of "micronization" refer to fluid energy milling, or jet milling, wherein the particle size reduction is achieved by collision between the particles being ground. The energy is typically supplied by a compressed fluid entering a grinding chamber of the micronizer at high speed and energy. Example micronizers are steam and air micronizers.

Finally, the phrase "milled particulate pigment" used herein and in the appended claims is defined as "pigment particles that have not been micronized, but have been sand milled, or media milled using zirconia or other milling media, or milled using other milling processes."

Particulate pigments are specially treated when used to prepare high performance polymer master batches. These high performance master batches are useful in applications in which dispersion, thermal stability, and lacing resistance are critical. The current belief is that the particulate pigment must be hydrophobic to achieve a good performance in plastic master batch applications, and that micronization is necessary to achieve adequate de-agglomeration of the particulate pigment.

To improve the dispersibility in plastics, numerous surface treatments have been studied. For example, U.S. Pat. No. 7,601,780 discloses a silanized inorganic powder treated with a long chain fatty acid, and U.S. Pat. No. 6,765,041 discloses treatment with organo-acid phosphates. U.S. Pat. No. 4,810,305 discloses hydrophobic pigments and fillers obtained by surface treatment with specific organopolysiloxanes. The surface-treated inorganic powders are micronized prior to loading into a polymer concentrate.

Treatment of particulate pigment with an organosulfonic coating agent is disclosed in U.S. Pat. No. 6,646,037. The organosulfonic coating agent is added before or during micronization using steam or air to produce a finished pigment retaining high levels of the organosulfonic coating agent. The resulting micronized pigment has improved dispersiblity in plastics, but as disclosed, still incurs the cost of high energy micronization prior to blending with polymer resin to form a polymer concentrate.

U.S. Pat. No. 5,837,049 discloses treating particulate titanium dioxide with alkylphosphonic acids and esters. Unlike phosphonate salts, the alkylphosphonic acids and esters thereof are not readily soluble in water and are typically mixed with a solvent such as alcohol, melted, and/or emulsified by rapid stirring or addition of emulsifying agents. The coated pigment is then processed conventionally.

In contrast, it has been discovered that particulate pigment can be surface-treated with a basic pH aqueous solution containing a water soluble organic salt, wherein the pH is sufficiently basic to insure that the organic salt is not protonated. Surprisingly, the resulting organic-coated particulate pigment can be loaded into a polymer resin to form a polymer resin having from about 50 wt % to about 87 wt % particulate pigment without prior micronization, and the resulting polymer concentrate has a dispersion efficiency comparable to a hydrophobic surface treated, micronized, particulate pigment. By "comparable" it is meant that dispersibility measurements of the pigment in polymer concentrate are at least 90% of or better than the dispersibility measurements obtained after micronization of the surface-treated pigment or having a dispersion count less than 5,000 using the procedures described in the Examples below. Since micronization is an energy-intensive operation, the presently described process results in significant cost savings. Further, the ability to add water soluble coating salts to an aqueous slurry without emulsification results in significant process simplification.

While not wishing to be bound by any particular theory, it is believed that the ionic portion of the organic molecule interacts with the pigment surface leaving the C-chain to cover the pigment surface and hence provide the hydrophobicity that is required to blend with a polymer such as polyethylene. Further, upon drying, the water soluble organic salt occupies the pores and spaces between the pigment particles, helping in their de-agglomeration upon compounding and extruding such that micronization is not necessary.

It is important for the organic salt to be in a salt form, i.e. unprotonated, and water soluble. Protonated organics bond differently to the surface of the pigment particles. In one embodiment, the basic aqueous solution is sufficiently basic that it can maintain a basic environment and the salt form of the organic even after mixing with a neutral or acidic milled particulate pigment. The pH of the basic aqueous solution can be further adjusted prior to or during addition to the milled particulate pigment. Examples of suitable reagents for adjusting the pH include sodium hydroxide, ammonium hydroxide, potassium hydroxide and amines.

Nonlimiting examples of suitable water soluble organic salts include sulfonate, phosphate, phosphonate, and phosphinate salts. The term "water soluble organic salt" refers to both the organic acid salts and to organic acids that have been deprotonated by addition of a base, causing the organic to convert to a salt form.

In one embodiment, the water soluble organic salt comprises a sulfonate salt; i.e. an organosulfonic acid salt, that may be represented by the formula: $(R\!-\!SO_3)_x M^{x+}$ wherein $x=1, 2, 3,$ or $4$; M is a sodium, potassium, ammonium, organoammonium or other metal ion with a valence of $+1, +2, +3$ or $+4$; and R is a hydrocarbon group having from 2 to 22 carbon atoms. R can be saturated, unsaturated, branched, linear or cyclic. Nonlimiting examples of suitable hydrocarbon groups include, ethyl-, propyl-, butyl-, isobutyl-, tertiary butyl-, pentyl-, hexyl-, heptyl-, octyl-, 2-ethylhexyl-, decyl-, dodecyl- and the like. Nonlimiting examples of suitable metal ions include $Na^{1+}$, $Ca^{2+}$, $Mg^{2+}$, $Al^{3+}$ and $Ti^{4+}$.

In one embodiment, the water soluble organic salt is prepared by sulfonation of C14-C16 olefins. The resulting water soluble organic composition consists chiefly of sodium alkene sulfonates and sodium hydroxyalkane sulfonates. Nonlimiting examples of a suitable water soluble organic salt include sodium α-olefin sulfonate (AOS) such as a C14-C16 sodium alkene sulfonate and/or sodium hydroxyalkane sulfonate.

In another embodiment, the water soluble organic salt comprises a phosphonate salt such as a sodium organophosphonate or sodium alkylphosphonate. For example, the water soluble organic phosphonate salt can be represented by the chemical formula: $R\!-\!PO\!-\!(O^-)_2(M^{+2/x})_x$, wherein M is selected from the group consisting of ammonium, organoammonium ions, and metal ions with a valence of +1 or +2. In this formula, x is 1 or 2, and R is a hydrocarbon group having from 2 to about 22 carbon atoms.

In one embodiment, the amount of water soluble organic salt mixed with particulate pigment is from about 0.1% to about 20% by weight, based on the weight of the particulate pigment. In another embodiment, the dry organic-coated particulate pigment includes from about 0.1% to about 5.0% water soluble organic salt, based on the weight of the particulate pigment. In yet another embodiment, the dry, organic-coated particulate pigments includes from about 0.5% to about 2.0% water soluble organic salt.

The particulate pigment can comprise titanium dioxide, zinc oxide, kaolin, talc, mica and the like. In one embodiment, the particulate pigment comprises titanium dioxide. Titanium dioxide is commercially manufactured by either the sulfate process to produce anatase or rutile titanium dioxide, or the chloride process to produce rutile titanium dioxide. In the chloride process, the titanium dioxide can be obtained from an oxidizer where titanium tetrachloride is reacted with oxygen in a high temperature reactor, followed by rapid cooling to deliver the desired pigmentary particle size. Conventionally, the oxidizer discharge is mixed with water to form a slurry which is then processed in subsequent steps such as wet milling and, optionally, a wet surface treatment which can leave a hydrophilic surface. If the hydrophilic surface is not modified to become hydrophobic, the pigment can have poor dispersibility in plastics. The processing steps are well known to those skilled in the art.

The particle size can range from about 0.001 micron to about 20 microns. For particulate inorganic solids used specifically for pigmentary purposes, the average particle size ranges from about 0.1 microns to about 0.5 microns. Generally, when the particulate inorganic solid is titanium dioxide in the pigmentary form, the average particle size is in the range of 0.15 microns to 0.35 microns. When the particulate inorganic solid is transparent titanium dioxide, the average particle size is typically from about 0.01 to 0.15 microns, while ultrafine or nanoparticle solids can have an average primary particle size in the range of from about 0.001 micron to about 0.1 micron. When the particulate inorganic solid shape is roughly spherical, these measurements represent the diameter. When the particulate inorganic solid shape is acicular or nonspherical, then these measurements represent the measurement of the longest dimension.

In one embodiment, the basic pH aqueous solution of water soluble organic salt is added to a particulate pigment dryer feed, directly to the dryer, or to the particulate dryer discharge. Nonlimiting examples of suitable dryers include a spray dryer and a spin flash dryer. In a related embodiment, a slurry of particulate pigment is filtered prior to feeding to the dryer. The basic pH aqueous solution of water soluble organic salt is added to the filter cake, relying on the attraction of the organic salt for the particle surface to obtain good surface coverage. Alternatively, the cake and basic pH aqueous solution of water soluble organic salt can be mixed using, for example, a V-shell blender.

Unmilled base titanium dioxide includes crude titanium dioxide discharge product from the oxidation reactor in the chloride process or from the calciner in the sulfate process, where it was produced, which has not been subjected to any prior intervening processing step that substantially grinds, crushes, or mills the discharge product. Milling can be performed to the extent necessary to break down oversize aggregates and to disperse the particles. Often a vertical or horizontal mill such as a sand mill, zirconia mill, or horizontal media mill is used. These milling processes, as well as other suitable milling processes, are familiar to those skilled in the art and are distinguished from the much more energy intensive micronization processes in that media are used to break down the aggregates.

In one embodiment, particulate pigment is wet milled in a vertical or horizontal media mill and a basic pH solution of water soluble organic salt is mixed with the particulate pigment before, during, or after the milling process. In another embodiment, the particulate pigment is mixed with the basic pH solution of water soluble organic salt in a mixing device before or after the milling process.

Milled base titanium dioxide may be treated with metal oxides such as aluminum oxide, silicon dioxide, zirconium oxide, phosphate and the like, using any process known to those skilled in the art, prior to treatment with the water soluble organic salt. For example, one may also choose to treat milled particulate pigment with inorganic phosphates or combinations of inorganic phosphates and metal oxides. Additionally, the particulate titanium dioxide may be secondarily treated with polyalcohols such as trimethylolethane and trimethylolpropane or alkanolamines such as triethanolamine subsequent to addition of the water soluble organic salt. Further, one may choose to treat with combinations or mixtures of the aforementioned compounds.

Optionally, a hydrophobic organic compound is added the particulate pigment together with, or sequentially to, addition of the basic pH aqueous solution of water soluble organic salt. For example, hydrophobic organic phosphoric acids, silanes, and/or phosphonic acids can be added to the pigment prior to, during, or after the drying step. In one embodiment, the hydrophobic organic compound is added in amounts of 0.05% and higher based on the weight of titanium dioxide.

Alumina is often added commercially to dried titanium dioxide pigment as a conveying aid. However, alumina is thought to be detrimental to particulate pigments in some plastics applications because it tends to absorb moisture and cause lacing in extruded polymer film applications. Thus, in one embodiment, a hydrophobic organic compound or water-free organic salt is added to the dry, organic-coated particulate pigment as a conveyor aid, and alumina addition is avoided.

Unlike conventional processing requiring micronization, the dried, organic-coated particulate pigment, without having undergone a micronization step, is combined directly with a polymer resin to form a polymer matrix. Thus, in one embodiment, organic-coated particulate titanium dioxide pigment is discharged from a dryer, for example a spray dryer or spin flash dryer, and combined directly with a polymer resin to form a polymer matrix. The phrase "polymer matrix" refers to the substance comprising the polymer resin and the dry, organic-coated particulate pigment. The elimination of the micronization step prior to compounding with polymer resin is unique and allows significant cost savings.

Suitable polymer types include polyvinylchloride, polyurethanes, polysulfones, polyimides, polyesters and chlorinated polyesters, polyoxyethylenes, phenolics, alkyds, amino resins, epoxy resins, phenoxy resins and acetal resins. Other polymer resins that may be of use include, but are not limited to, copolymers of ethylene with alpha-olefins containing 4 to 12 carbon atoms or vinyl acetate, vinyl homopolymers, acrylic homopolymers and copolymers, polyamides, polycarbonates, polystyrene, acrylonitrile-butadiene-styrenes and polyethers. Methods for combining particulate pigment with polymers are well known to persons skilled in the art.

In one embodiment, the polymer resin is a polyolefin such as polyethylene, polypropylene, and polybutylene. In another embodiment, the polymer resin is polyethylene.

The organic-coated particulate pigment may be combined with the polymer resin using a loading of up to about 87% by weight, based on the weight of the polymer matrix. In one embodiment, a loading of organic-coated particulate pigment of about 50% to about 87% by weight based on the weight of the polymer matrix is prepared. This loading may be used as a masterbatch. A "masterbatch" is meant to refer herein to a concentrated mixture of particulate pigment in polymer. Pigment is commonly prepared in a masterbatch form to provide a dust-free concentrated pigment of known composition with improved dispersibility in the polymer to which the masterbatch will be added. The methods for creating a masterbatch with particulate pigment are known or easily known to persons skilled in the art. For example, the masterbatch may be created by combining the organic-coated particulate pigment and the polymer resin using a BR Banbury Mixer.

In order to further illustrate the present invention, the following examples are given. However, it is to be understood that the examples are for illustrative purposes only and are not to be construed as limiting the scope of the invention.

EXAMPLES

Using a small-scale laboratory extrusion apparatus, a measure of titanium dioxide pigment dispersion into organic polymers was obtained by measuring the relative amount of pigment trapped onto screens of extruder screen packs. Tests were made using 75% $TiO_2$ concentrates in low density polyethylene prepared using a Haake 3000 Rheomix mixer. The mixer was controlled and monitored with a Haake 9000 Rheocord Torque Rheometer. 337.7 grams of micronized TiO$_2$ and 112.6 grams of NA209 LDPE manufactured by Equistar were dry blended and added to the 75° C. mixing chamber with rotors operating at 50 rpm. The mixer temperature was programmed to increase to 120° C. one minute after the dry blend was introduced to the mixing chamber. After a steady state mixture was achieved, the compound was mixed for an additional 3 minutes. The compound was removed from the chamber and granulated using a Cumberland crusher.

Dispersion tests were conducted using a Killion single screw extruder, model KL-100 equipped with a 20:1 length to diameter screw. The extruder was preheated at 330°, 350°, 390° and 380° F. from zone 1 to the die, respectively, and operated at 70 rpm. A purge of 1000 grams of NA952 LDPE manufactured by Equistar was run through the system, and a new screen pack was installed. The screen pack consisted of 40/500/200/100 mesh screens from the die towards the extruder throat. After temperature stabilization, 133.33 grams of granulated 75% TiO$_2$ concentrate was fed into the extruder. This was followed with 1500 grams of NA952 purge as the feed hopper emptied. After the LDPE purge was extruded, the screens were removed, separated and tested using a relative count technique from the measurements from an X-ray fluorescence spectrometer. The number of TiO$_2$ counts per second was obtained for the 100, 200 and 500 mesh screens in the pack and totaled to obtain the dispersion result. A count result of less than 5000 is considered to represent excellent dispersion.

Bulk density was measured using a graduated cylinder placed on the balance and tared. A funnel was placed in the top of the graduated cylinder and pigment was added without shaking, tapping, or disturbing the graduated cylinder. The graduated cylinder was filled to the highest volume and the volume of pigment in the graduated cylinder recorded. With minimal disturbance, the graduated cylinder was placed on the balance and the weight of the pigment in the cylinder recorded. The cylinder was loaded and secured on a Copely JV 2000 machine. The Copely JV 2000 machine was run for 5 minutes after which the volume of the pigment in the cylinder was recorded.

Example 1

Acid Milling

Neutral or blue tone TiO$_2$ oxidizer discharge slurry, with a pH 3.2 to 4.0 and density between 400 and 900 g/l, was sand milled for 20 to 80 min. The pH of the resulting slurry was adjusted to 6.5 with 50% caustic solution and the slurry was then treated with 1.25% Calsoft® AOS-40, based on the TiO$_2$ weight. The water soluble organic Calsoft® AOS-40 is a sodium alpha olefin (C14-16) sulfonate produced by Pilot Chemical Co. This mixture of long chain sulfonate salts is prepared by sulfonation of C14-16 alpha olefins and consists chiefly of sodium alkene sulfonates and sodium hydroxyalkane sulfonates. After the AOS addition, the pH is expected to be between 7.0 and 9.5. The slurry was spray dried in a timely fashion using a GEA Niro MOBILE MINOR™ Spray dryer, a GEA Niro internal mixing spray nozzle, an inlet temperature of 330° C., and an atomizing air flow of 3.69 kg/hr.

Pigment flow was set to maintain a temperature between 115° C. and 119° C. at the exit of the spray dryer. The bottom discharge and the final cyclone samples were mixed together and tested as a final product. Results are shown in Table 1 below and compared with a standard micronized plastics grade pigment Tiona®188 prepared as described in the Comparative Examples section. As can be seen, the product properties of acid-milled pigment treated with a water soluble organic salt and no micronization are equivalent to or better than those of a standard micronized plastics grade pigment.

TABLE 1

| Acid Milling Neutral Tone | Sand Milling (min.) | Dispersion Counts | Bulk Density | |
|---|---|---|---|---|
| | | | Loose | Packed |
| Test 1 | 40 | 219 | 0.83 | 1.16 |
| Test 2 | 40 | 215 | 0.82 | 1.15 |
| Test 3 | 40 | 279 | 0.83 | 1.17 |
| Test 4 | 40 | 268 | 0.87 | 1.17 |
| Test 5 | 40 | 678 | 0.98 | 1.35 |
| Test 6 | 160 | 458 | 0.95 | 1.29 |
| Tiona ®188 | | 644 | 0.74 | 0.87 |

Example 2

Base Milling

Using procedures similar to Example 1, the pH of the oxidizer discharge slurry was adjusted with Calgon/caustic mix to pH 9-11 prior to sand milling. The pH of the sand milled slurry was then dropped to about 6.5 with 50% HCl and the above treatment and drying procedures in Example 1 were followed.

The results are shown in Table 2 below and compared with a standard micronized plastics grade pigment Tiona®188 prepared as described in the Comparative Examples section. As can be seen, the product properties of base-milled pigment treated with a water soluble organic salt are nearly equivalent to those of a standard micronized plastics grade pigment, but with a significant cost savings due to the omission of the micronization step.

TABLE 2

| Base Milling Blue Tone | Sand Milling (min.) | Dispersion Counts | Bulk Density | |
|---|---|---|---|---|
| | | | Loose | Packed |
| Test 1 | 40 | 722 | 0.81 | 1.09 |
| Test 2 | 40 | 863 | 0.81 | 1.11 |
| Test 3 | 40 | 888 | 0.78 | 1.08 |
| Tiona ®188 | | 651 | 0.75 | 0.83 |

From the above description, it is clear that the inventive concepts disclosed herein are well adapted to carry out the objects and to attain the advantages mentioned herein as well as those inherent in the inventive concepts disclosed herein. While exemplary embodiments of the inventive concepts disclosed herein have been described for purposes of this disclosure, it will be understood that numerous changes may be made which will readily suggest themselves to those skilled in the art and which are accomplished without departing from the scope of the inventive concepts disclosed herein and defined by the appended claims.

What is claimed is:

1. A process for loading particulate pigment into a polymer concentrate, the process comprising the steps of:
   (a) milling an oxidizer discharge slurry of particulate pigment comprising titanium dioxide;
   (b) adding a basic pH aqueous solution comprising a water soluble organic salt to the milled particulate pigment comprising titanium dioxide to form an organic-coated particulate pigment, wherein the pH of the basic aqueous solution is sufficiently basic to maintain the water soluble organic salt in a salt form both before and after addition to the milled particulate pigment; and (c) without a prior micronization step, mixing the organic-coated particulate pigment with a polymer resin to form a polymer concentrate having from about 50 wt % to about 87 wt % particulate pigment with dispersibility comparable to micronized organic-coated particulate pigment.

2. The process of claim 1, wherein the water soluble organic salt comprises at least one from the group consisting of a sulfonate salt, a phosphate salt, a phosphonate salt, and a phosphinate salt.

3. The process of claim 1, wherein the water soluble organic salt comprises a sulfonate salt having the formula:

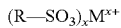

wherein x=1, 2, 3 or 4,

M is selected from the group consisting of ammonium, organoammonium ions, and metal ions with a valence of +1, +2, +3, or +4, and R is an organic group having from 2 to 22 carbon atoms.

4. The process of claim 3, wherein R comprises a C14 to C16 alpha olefin.

5. The process of claim 1, wherein the water soluble organic salt comprises at least one sodium alpha-olefin sulfonate.

6. The process of claim 1, wherein the water soluble organic salt comprises at least one of the group consisting of phosphate, phosphonate, and phosphinate salts.

7. The process of claim 6, wherein the water soluble organic salt comprises at least one sodium organophosphonate.

8. The process of claim 1, wherein the water soluble organic salt comprises a phosphonate salt having a formula $R-PO-(O^-)_2(M^{+2/x})_x$, wherein M is selected from the group consisting of ammonium, organoammonium ions, and metal ions with a valence of +1 or +2, x is 1 or 2, and R is a hydrocarbon group having from 2 to 22 carbon atoms.

9. The process of claim 1, wherein the water soluble organic salt is added to the particulate pigment in an amount of from about 0.1% to about 20% based on the weight of particulate pigment.

10. The process of claim 1, wherein the titanium dioxide is obtained from an oxidizer of a chloride process for production of titanium dioxide.

11. The process of claim 10, further comprising the step of drying the milled particulate pigment in a pigment dryer, and the basic pH aqueous solution of water soluble organic salt is added to at least one of a feed to the pigment dryer and a discharge from the pigment dryer.

12. The process of claim 11, wherein the pigment dryer is selected from at least one from the group consisting of a spray dryer and a spin flash dryer.

13. The process of claim 1, further comprising the step of: adding a hydrophobic organic coating agent to the milled particulate pigment before, together with, or after the step of adding a basic pH aqueous solution of water soluble organic salt to the milled particulate pigment.

14. The process of claim 1, wherein the polymer concentrate comprises particulate pigment in an amount of from about 65% to about 87% by weight of the polymer concentrate.

15. The process of claim 1, wherein the polymer resin is selected from the group consisting of polyolefins, polyvinyl chlorides, polyurethanes, polysulfones, polyimides, polyesters and chlorinated polyesters, polyoxyethylenes, phenolics, alkyds, amino resins, epoxy resins, phenoxy resins, acetal resins, and polystyrenes.

16. The process of claim 1, wherein the polymer resin comprises a polyolefin selected from the group consisting of polyethylene, polypropylene, and polybutylene.

17. The process of claim 1, wherein the polymer resin comprises polyethylene.

18. The process of claim 17, wherein the polymer concentrate comprises particulate pigment in an amount of from about 65% to about 87% by weight of the polymer concentrate.

19. The process of claim 1, further comprising the step of milling an acidic slurry of particulate pigment comprising titanium dioxide prior to the step of adding the basic pH aqueous solution comprising a water soluble organic salt to the acidic milled particulate pigment.

* * * * *